(12) United States Patent
Trivelpiece et al.

(10) Patent No.: US 10,949,723 B2
(45) Date of Patent: Mar. 16, 2021

(54) SYSTEMS AND METHODS FOR PROVIDING A TAG WITH A MINIATURE ZERO POWER MOTION DETECTOR AND ENERGY HARVESTER

(71) Applicants: Craig E. Trivelpiece, Mission Viejo, CA (US); Steve E. Trivelpiece, Rancho Santa Margarita, CA (US)

(72) Inventors: Craig E. Trivelpiece, Mission Viejo, CA (US); Steve E. Trivelpiece, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 62 days.

(21) Appl. No.: 15/966,707

(22) Filed: Apr. 30, 2018

(65) Prior Publication Data
US 2019/0332910 A1   Oct. 31, 2019

(51) Int. Cl.
| | |
|---|---|
| *G06K 19/00* | (2006.01) |
| *G06K 19/07* | (2006.01) |
| *G06K 7/10* | (2006.01) |
| *G06K 19/077* | (2006.01) |
| *G08B 13/24* | (2006.01) |

(52) U.S. Cl.
CPC ..... *G06K 19/0708* (2013.01); *G06K 7/10425* (2013.01); *G06K 19/07758* (2013.01); *G08B 13/2417* (2013.01)

(58) Field of Classification Search
CPC .......... G06K 19/0708; G06K 7/10425; G06K 19/07758; G06K 19/0719; G06K 19/0723; G06K 19/0711; G08B 13/2417

USPC ................ 235/375, 435, 439, 454, 487, 492
See application file for complete search history.

(56) References Cited

U.S. PATENT DOCUMENTS

| | | | | |
|---|---|---|---|---|
| 5,183,056 | A | * | 2/1993 | Dalen ................... A61B 5/1118 340/429 |
| 2004/0046675 | A1 | * | 3/2004 | Murata .............. G08B 13/1436 340/686.1 |
| 2010/0141452 | A1 | * | 6/2010 | Lian ................... G08B 13/2417 340/572.3 |
| 2011/0187207 | A1 | * | 8/2011 | Arnold ................... H02K 35/02 310/11 |
| 2012/0032803 | A1 | * | 2/2012 | Copeland ........... G08B 13/2431 340/572.1 |
| 2017/0187253 | A1 | | 6/2017 | Moyerman et al. |
| 2018/0040219 | A1 | | 2/2018 | Clark et al. |

OTHER PUBLICATIONS

International Search Report and Written Opinion dated Jul. 19, 2019 for PCT/US19/29589.

\* cited by examiner

*Primary Examiner* — Matthew Mikels
(74) *Attorney, Agent, or Firm* — Arent Fox LLP (57) ABSTRACT

Systems and methods for operating a tag. The method comprising: causing motion of a spherical permanent magnet which is disposed and freely movable in a three dimensional internal space of a non-magnetic hollow sphere located within the tag; using the spherical permanent magnet's motion to cause a change in a magnetic flux in a wire wrapped around at least a portion of the non-magnetic hollow sphere, where the change in the magnetic flux induces a current in the wire; and supplying the current to at least one device of the tag's internal electronic devices that is configured to facilitate at least one of an inventory count and an inventory security.

7 Claims, 8 Drawing Sheets

SYSTEMS AND METHODS FOR PROVIDING A TAG WITH A MINIATURE ZERO POWER MOTION DETECTOR AND ENERGY HARVESTER

BACKGROUND

Statement of the Technical Field

The present disclosure relates generally to tag based systems. More particularly, the present disclosure relates to implementing systems and methods for robust protection of item authentication, tracking and tracing against tag duplication.

Description of the Related Art

There are many types, sizes and prices of devices on the market that either detect motion or harvest energy power for electronics. For self-powering devices (e.g., Radio Frequency Identification ("RFID") chips), these solutions are all too large, too expensive or in the case of motion require constant power which doesn't exist. Devices such as piezo electric energy harvesters require weights, leverage or torsion on a fairly large piezo device.

SUMMARY

The present disclosure generally concerns implementing systems and methods for operating a tag. The tag comprises an RFID tag and/or an Electronic Article Surveillance component. The methods comprise: causing motion of a spherical permanent magnet which is disposed and freely movable in a three dimensional internal space of a non-magnetic hollow sphere located within the tag; and using the spherical permanent magnet's motion to cause a change in a magnetic flux in a wire wrapped around at least a portion of the non-magnetic hollow sphere. The change in the magnetic flux induces a current in the wire. The current is then used to supply power to at least one device of the tag's internal electronic devices that is configured to facilitate at least one of an inventory count and an inventory security.

In some scenarios, the wire extends in a single direction along an outer surface of the non-magnetic hollow sphere, or is wrapped around the non-magnetic hollow sphere in at least two orthogonal directions. The current is generated from 3D motion of the spherical permanent magnet.

In those or other scenarios, the at least one device comprises a communications enabled device and/or an energy storage device (e.g., a rechargeable battery or a capacitor). The communications enabled device is supplied power only when the tag's magnetic current has indicated that the tag is in motion.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

An ideal solution to the conventional problems with RFID tags would be a device that is very small and could alert during motion while not draining any power while stationary. The device could also generate power from the motion to create a Battery Assisted Passive ("BAP") type of RFID tag from motion and/or use the motion to charge a small storage device on the tag (such as a supercap or thin film battery) to power the device while not in motion. Although RFID tags are mentioned here, this device can be used for generic Internet of Things ("IoT") devices, sensors, Central Processing Units ("CPUs"), and other circuitry or devices that want to respond to motion or use motion for energy harvesting.

The present solution provides a relatively small, inexpensive device that detects motion with no needed power and generates enough energy from motion to power an RFID tag. In this regard, motion detection sensors are provided with RFID tags. Motion detection allows the RFID tags to communicate while moving for tracking status and location. Otherwise, the RFID tags may not communicate or only communicate periodically while stationary. For passive RFID tags, there is no background RF energy needed to detect motion. BAP RFID tags for detecting motion requires constant monitoring, and therefore a drain on the small battery.

The device comprises a powerful, small permanent magnet enclosed in a thin-walled non-magnetic sphere. Disc shaped magnets and round magnets are now commercially available that are only one mm in diameter. A small plastic sphere (e.g., 3 mm in diameter) could (a) enclose the permanent magnet and (b) be wrapped with multiple turns of wire. Any motion of the sphere causes the permanent magnet to move within the sphere, thereby causing a change in magnetic flux in the wire. The change in magnetic flux causes current to be induced in the wire such that electricity is generated from the motion of the permanent magnet. Continued human or mechanical motion of the tag will cause the permanent magnet to continue to rotate and provide constant electricity on the output of the wires.

Normal motion generates at least 50 to 200 mV depending on the number of turns of the wire and the strength of the permanent magnet. This is more than enough to power an RFID tag and turn the RFID tag into a BAP type of tag with the benefits of additional range and computation power. There are standard circuits that can take this power and boost the voltage. This also provides an instant notification of motion but requires no background electricity to monitor motion circuits such as MEMS accelerometers. Motion can be used to charge and maintain an energy storage device in the RFID tag for utilization when not in motion.

Some of the novel features of the present solution are: small size and weight (e.g., 3 mm in diameter); low cost (e.g., only a few cents in medium volume); no monitoring circuitry required since motion detection is made by generating an electronic signal; and the amount of energy generated during motion is sufficient to power an RFID tag for better performance and additional circuitry. Optionally, there could be two orthogonal wraps of the wire around the non-magnetic sphere which could be tied together for energy harvesting, but could be separately analyzed to determine information about the direction and type of motion. In all scenarios, the present solution is able to generate electricity from the three dimensional ("3D") motion of the tag. This is a significant difference between conventional motion based harvesting devices which are designed to generate electricity only from two dimensional ("2D") motion of an object (e.g., a watch).

Illustrative Systems

Figure 1:
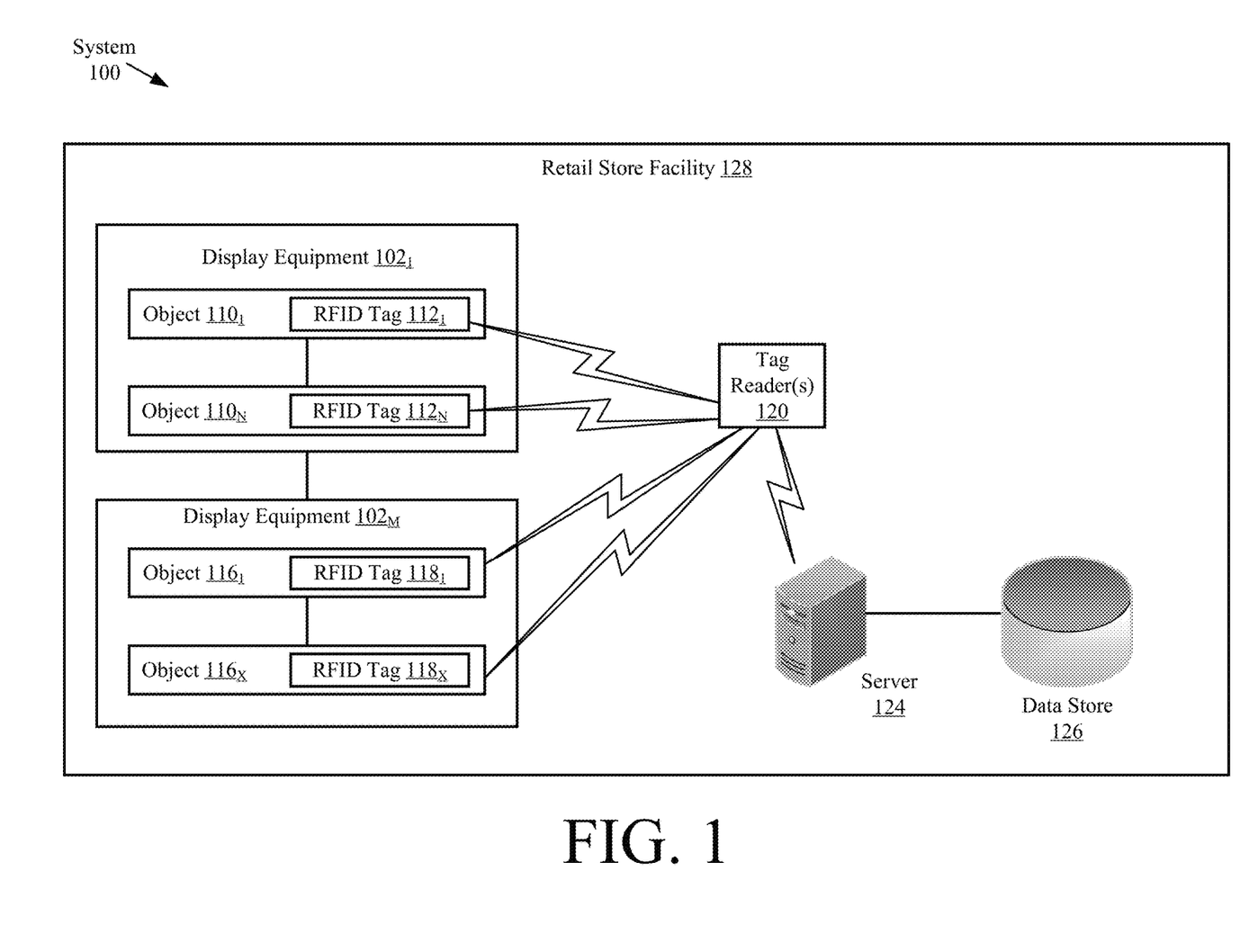
FIG. 1 is an illustration of an illustrative architecture for a system.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved inventory counts of objects and/or improved inventory security within a facility. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

At least one tag reader 120 is provided to assist in counting the objects $110_1$-$110_N$, $116_1$-$116_X$ located within the RSF 128. The tag reader 120 comprises an RFID reader configured to read RFID tags. RFID tags $112_1$-$112_N$ (collectively referred to as "112"), $118_1$-$118_X$ (collectively referred to as "118") are respectively attached or coupled to the objects $110_1$-$110_N$ (collectively referred to as "110"), $116_1$-$116_X$ (collectively referred to as "116"). The RFID tags are described herein as comprising single-technology tags that are only RFID enabled. The present solution is not limited in this regard. The RFID tags can alternatively or additionally comprise dual-technology tags that have both Electronic Article Surveillance ("EAS") and RFID capabilities. EAS tag technology is well known in the art, and therefore will not be described herein. Any known or to be known EAS tag technology can be used herein without limitation.

Notably, the tag reader 120 is strategically placed at a known location within the RSF 128. By correlating the tag reader's RFID tag reads and the tag reader's known location within the RSF 128, it is possible to determine the location of objects 110, 116 within the RSF 128. The tag reader's known coverage area also facilitates object location determinations. Accordingly, RFID tag read information and tag reader location information is stored in a data store 126. This information can be stored in the data store 126 using a server 124. Tag readers, servers and data stores are well known in the art, and therefore will not be described herein.

Illustrative Tag Architecture

Figure 2:
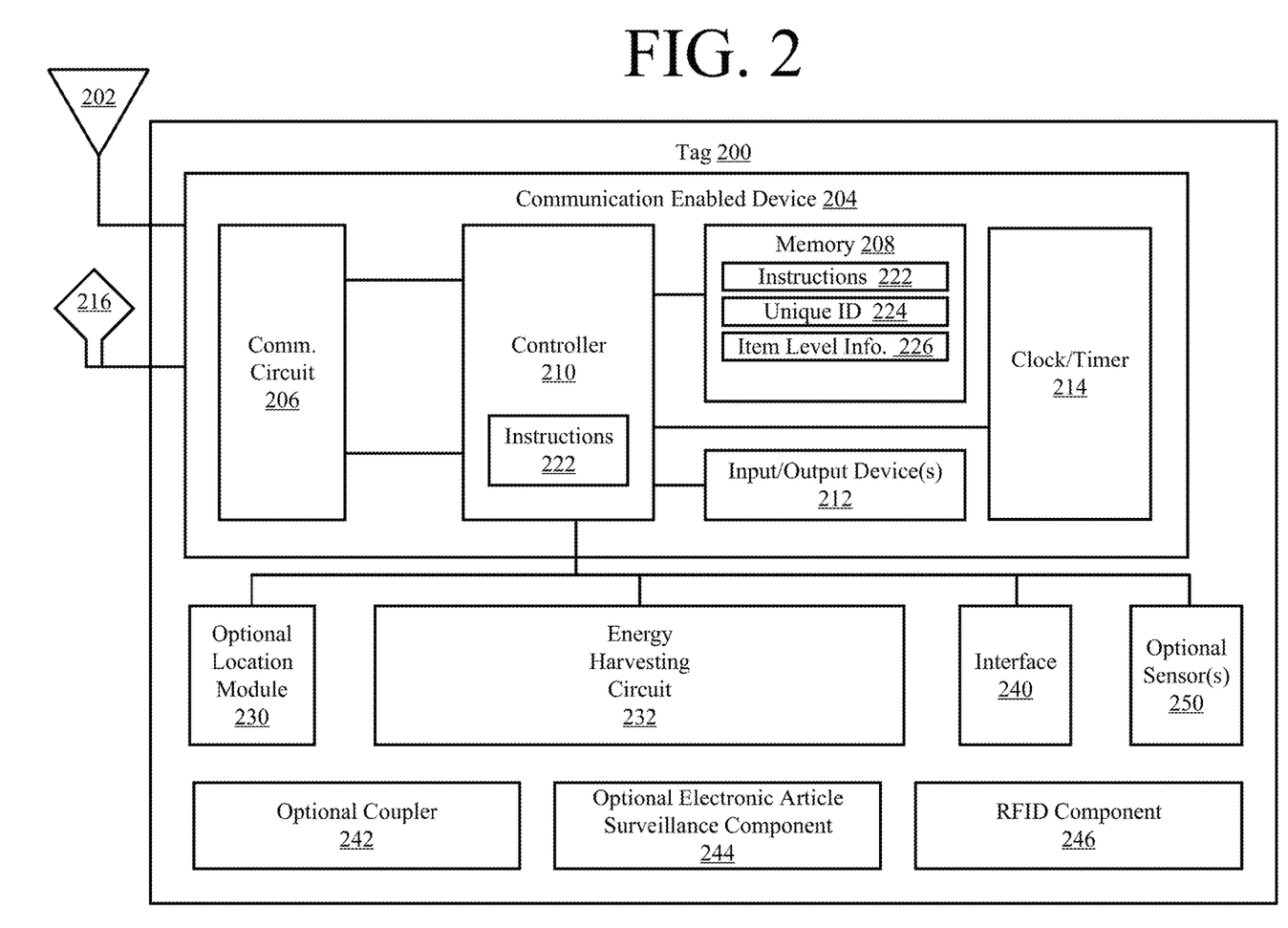
FIG. 2 provides an illustration of an illustrative architecture for a tag.

Referring now to FIG. 2, there is an illustration of an illustrative architecture for a tag 200. RFID tags 112, 118 are the same as or similar to tag 200. As such, the discussion of tag 200 is sufficient for understanding the RFID tags 112, 118 of FIG. 1. Tag 200 is generally configured to perform operations to generate electricity from the tag's motion. The manner in which the electricity is generated from the tag's motion will be discussed in detail below. The electricity is used to power various electronic components of the tag.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; B luetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communications circuit 206. Communications circuits are well known in the art, and therefore will not be described herein. Any known or to be known communications circuit can be used herein provided that it supports RFID communications. For example, in some scenarios, the communications circuit comprises a transceiver. In other scenarios, the communications circuit comprises a receiver and is configured to provide a backscatter response.

During operation, the communications circuit 206 processes received signals (e.g., RF signals) transmitted from external devices to determine whether it should transmit a response signal (e.g., RF carrier signal) to external devices or provide a backscatter response to the external device. In this way, the communication enabled device 204 facilitates the registration, identification, location and/or tracking of an item (e.g., object 110 or 112 of FIG. 1) to which the tag 200 is coupled.

In some scenarios, the communication enabled device 204 is configured so that it communicates (transmits and receives) in accordance with a motion activated communication scheme. The motion activated communication scheme involves: generating electricity from the tag's motion; and using the generated electricity to power the electronic components 206-214 of the communication enabled device 204 while the tag is in motion. Additionally, the electricity can be used to charge a storage device such as a battery or capacitor. The energy stored by the storage device can then be used to power the electronic components 206-214 of the communication enabled device 204 while the tag is stationary.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communications circuit 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include an optional EAS component 244 and/or a passive/active/semi-passive RFID component 246. Each of the listed components 244, 246 is well known in the art, and therefore will not be described herein. Any known or to be known battery, EAS component and/or RFID component can be used herein without limitation.

As shown in FIG. 2, the tag 200 further comprises an energy harvesting circuit 232. In some scenarios, the energy harvesting circuit 232 is configured to harvest energy from the tag's motion and to generate output power from the harvested energy. The energy harvesting circuits will be discussed below in relation to FIGS. 3-6.

As noted above, the tag 200 may also include one or more sensors 250. Sensors are well known in the art, and therefore will not be described herein. Any known or to be known sensor can be used herein without limitation. For example, the sensor 250 includes, but is not limited to, a vibration sensor, an accelerometer, a gyroscope, a linear motion sensor, a Passive Infrared ("PIR") sensor, a tilt sensor, a rotation sensor, a temperature sensor, and/or a proximity sensor.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., receiver operations), (b) couple or decouple an antenna to and from the first tag element, and/or (c) cause an operational state of the first tag element to be changed (e.g., cause transitioning the first tag element between a power save mode and non-power save mode).

Figure 3:
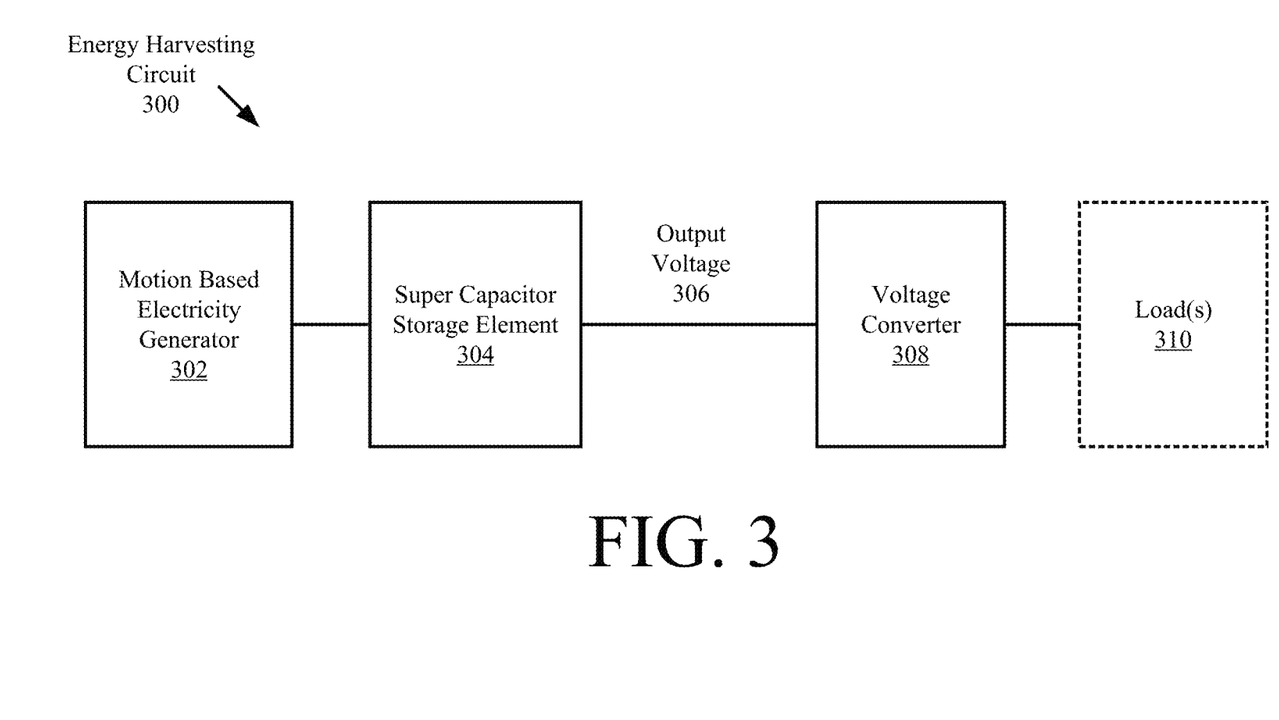
FIG. 3 is an illustration of an illustrative architecture for the energy harvesting circuit shown in FIG. 2.

Referring now to FIG. 3, there is provided a block diagram of an illustrative architecture for the energy harvesting circuit 300. The energy harvesting circuit 232 of FIG. 2 can be the same as energy harvesting circuit 300. As such, the discussion of energy harvesting circuit 300 is sufficient for understanding the energy harvesting circuit 232 of FIG. 2. The energy harvesting circuit 300 is not limited to the particular architecture shown in FIG. 3. In this regard, it should be understood that the energy harvesting circuit 300 can include more or less components than that shown in FIG. 3. An illustrative energy harvesting circuit including more components than that of FIG. 3 is provided in FIG. 4, which will discussed below.

The energy harvesting circuit 300 is configured to provide a way in which a tag (e.g., tag 200) is a self-sustaining sensor system wherein its power source would virtually never need to be replaced. In this regard, the energy harvesting circuit 300 comprises a motion based electricity generator 302, a Super Capacitor ("SC") storage element 304, and a voltage converter 308 electrically connected to a load(s) 310. The load 310 can include, but is not limited to, components 204, 230, 240, 250, 244 and/or 246 of FIG. 2.

At initial power up of the tag, the SC storage element 304 is assumed to be in a completely discharged state. Thus, the initial charge of the SC storage element 304 is at a level of approximately or substantially equal to zero volts. However, electricity is generated by the motion based electricity generator 302 when the tag is in motion. This generated electricity is used to charge the SC storage element 304. An output voltage 306 of the SC storage element is supplied to the load(s) 310 via the voltage converter 308. The tag 200 is considered fully operational when the output voltage 306 reaches a level (e.g., 3.8 V) that is sufficient to cause the load(s) to perform the intended operations thereof.

Figure 4:
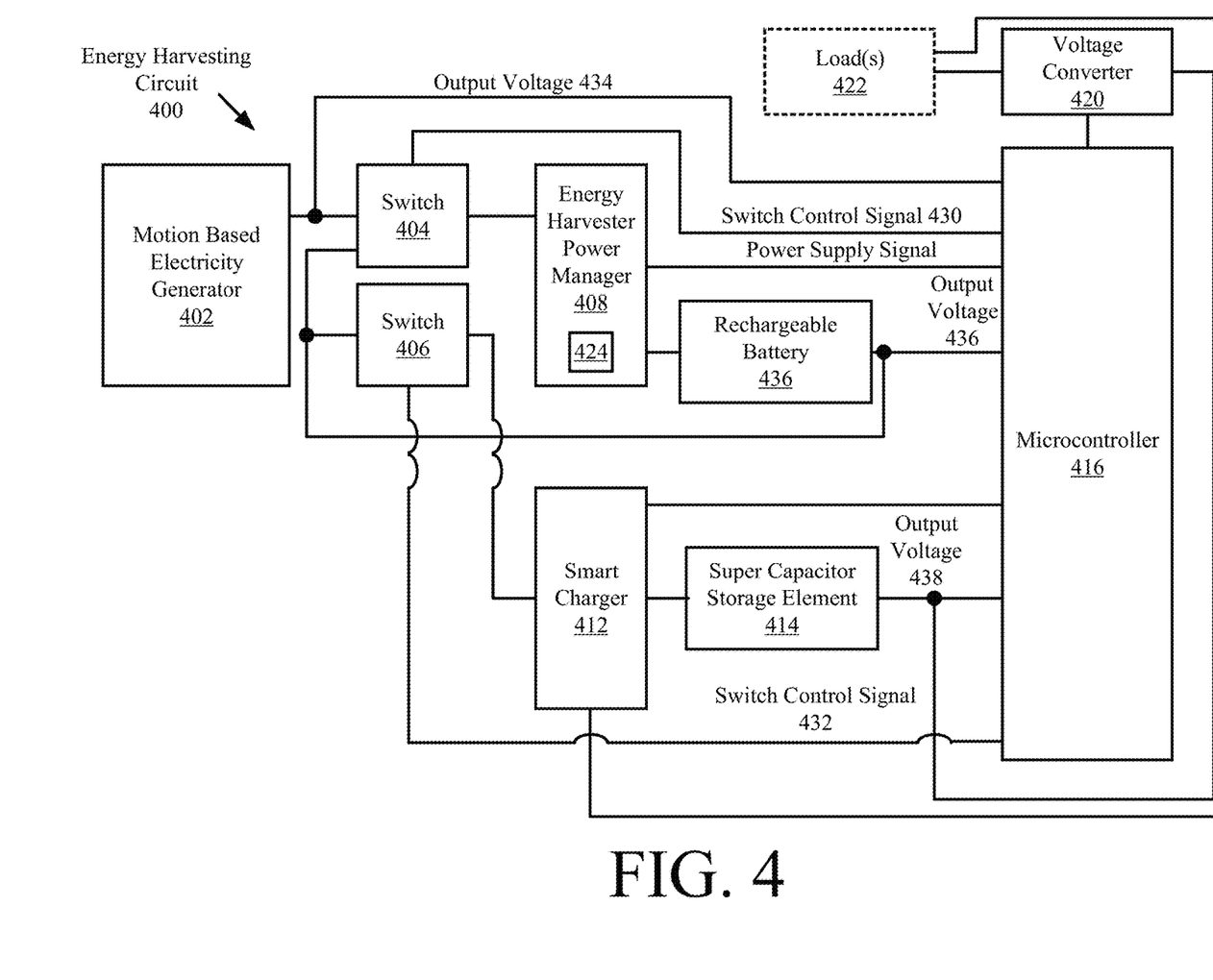
FIG. 4 is an illustration of another illustrative architecture for the energy harvesting circuit.

Referring now to FIG. 4, there is provided a block diagram of another illustrative architecture for an energy harvesting circuit 400 of a tag (e.g., tag 200 of FIG. 2). The energy harvesting circuit 232 of FIG. 2 can be the same as energy harvesting circuit 400. As such, the discussion of energy harvesting circuit 400 is sufficient for understanding the energy harvesting circuit 232 of FIG. 2. The energy harvesting circuit 400 is not limited to the particular architecture shown in FIG. 4. In this regard, it should be understood that the energy harvesting circuit 400 can include more or less components than that shown in FIG. 4.

The energy harvesting circuit 400 is configured to provide a way in which the tag is a self-sustaining sensor system wherein its power source would virtually never need to be replaced. In this regard, the energy harvesting circuit 400 comprises a motion based electricity generator 402, switches 404, 406, an Energy Harvester Power Manager ("EHPM") 408, a rechargeable battery 436, an SC storage element 414, a smart charger 412 for the SC storage element, a microcontroller 416, and a DC-DC voltage converter 420 electrically connected to a load(s) 422. The microcontroller 416 can be the same as or separate/distinct from the controller 210 of FIG. 2. The load 422 can include, but is not limited to, components 204, 230, 240, 250, 244 and/or 246 of FIG. 2.

At initial power up of the tag 200, the SC storage element 414 is assumed to be in a completely discharged state. Thus, the initial charge of the SC storage element 414 is at a level of approximately or substantially equal to zero volts. However, the power source (e.g., rechargeable battery) 436 is in a quasi-discharged state in which its initial charge is at a level greater than zero volts (e.g., 3 volts). As such, the power source (e.g., rechargeable battery) 436 has a sufficient amount of initial stored energy to nearly instantaneously enable operations of the control electronics of the tag. In this regard, an output voltage 436 is supplied from the power source (e.g., rechargeable battery) 436 to the EHPM 408 via switch 404, whereby operations of the EHPM 408 are started immediately after turning on the tag. The output voltage 436 is also supplied from the power source (e.g., rechargeable battery) 436 to the microcontroller 416 via the EHPM 408.

The available power from power source (e.g., rechargeable battery) is also used at this time to charge the SC storage element 414. In this regard, the output voltage 436 of the power source (e.g., rechargeable battery) 436 is supplied to the SC storage element 414 via switch 406 and smart charger 412, whereby charging of the SC storage element is expedited. An output voltage 438 of the SC storage element is supplied to the load(s) 422 via the voltage converter 420. The tag is considered fully operational when the output voltage 438 reaches a level (e.g., 3.8 V) that is sufficient to cause the load(s) to perform the intended operations thereof.

Throughout operation of the tag 400, the microcontroller 416 monitors the output voltage 434 of the motion based electricity generator 402, as well as the output voltage 436 of the power source (e.g., rechargeable battery) and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period, an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the power source (e.g., rechargeable battery) 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the motion based electricity generator 402 is active, the output voltage 434 of the motion based electricity generator 402 is supplied to the power source (e.g., rechargeable battery) 336 via EHPM 408. In effect, the power source (e.g., rechargeable battery) 336 is recharged by the motion based electricity generator 402, whereby the energy expended in charging and re-charging the SC storage element 414 is restored while the tag 400 is maintained in its fully operational state.

The above described process of using the power source (e.g., rechargeable battery) 336 to charge the SC storage element 414 is repeated as needed. Thus, the above described tag 400 performs self-monitoring and charges its respective re-chargeable elements throughout its entire operation.

Figure 5:
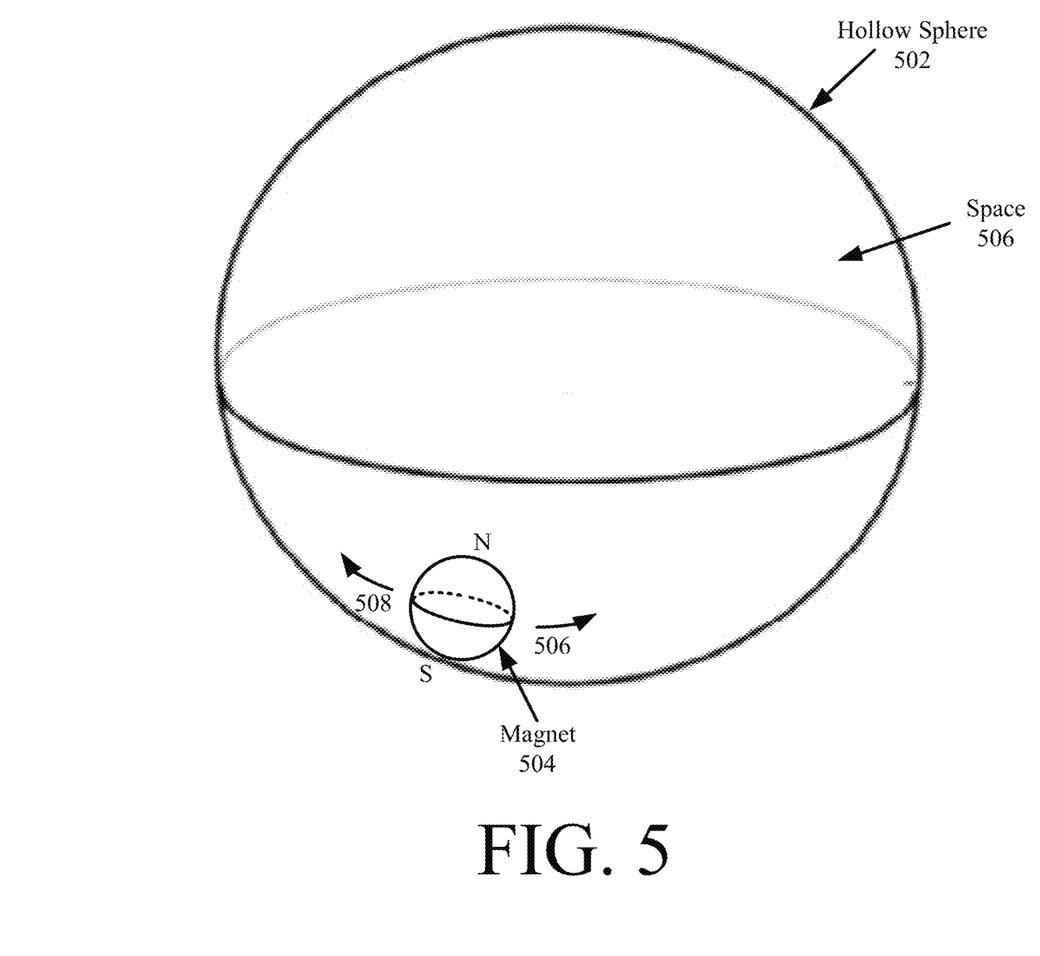
FIG. 5 is an illustration of a hollow sphere with a spherical magnet enclosed therein.
Figure 6:
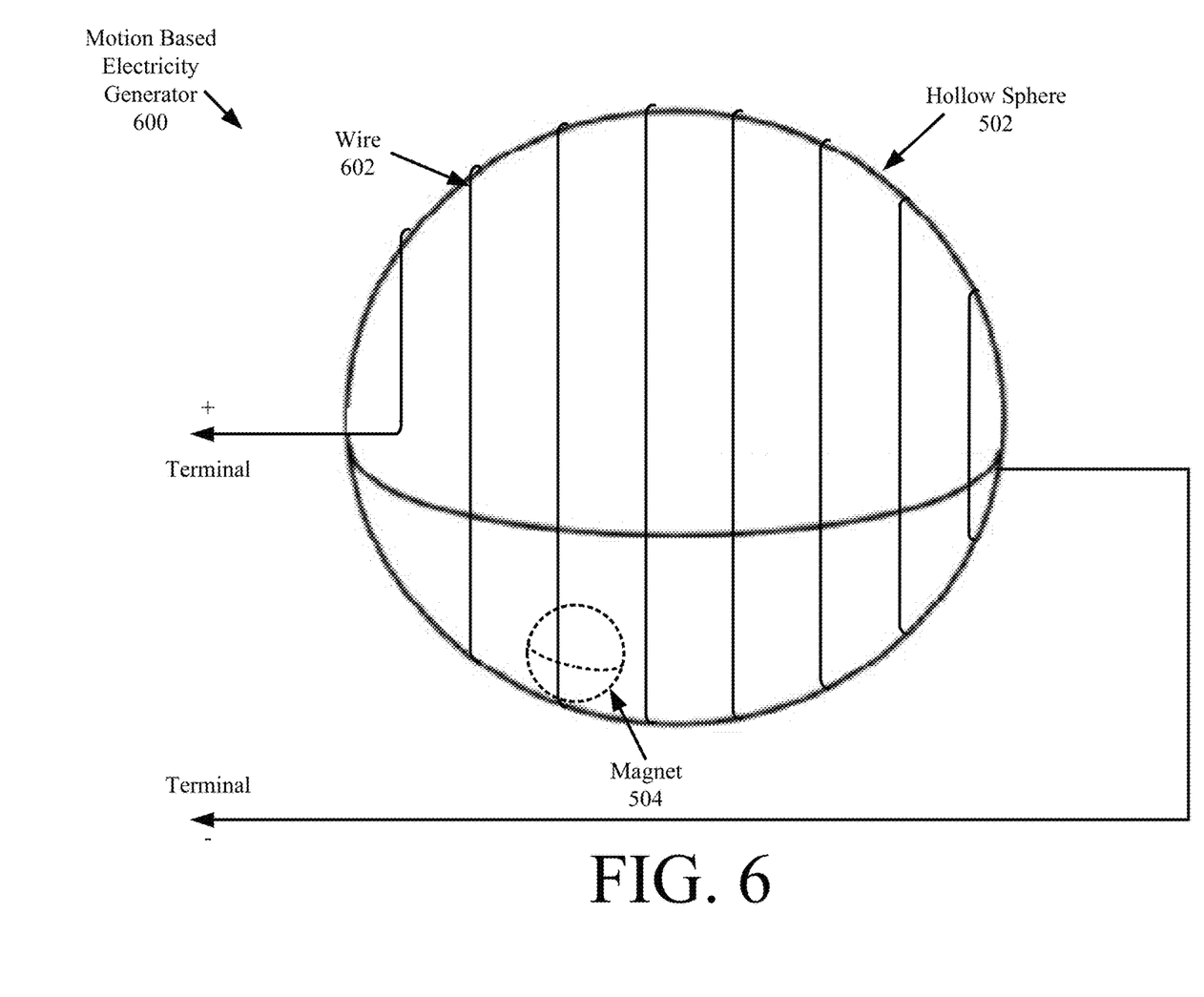
FIG. 6 is an illustration of an illustrative architecture for a motion based electricity generator.

Referring now to FIGS. 5-6, there are provided illustrations that are useful for understanding a motion based electricity generator 600. Motion based electricity generators 302, 402 are the same as or substantially similar to motion based electricity generator 600. As such, the discussion of motion based electricity generator 600 is sufficient for understanding motion based electricity generators 302, 402.

The motion based electricity generator 600 employs a device able to convert motion of the tag into electricity. This device comprises a hollow sphere 502 in which a spherical permanent magnet 504 is disposed. The hollow sphere 502 is formed of any non-magnetic material. Such non-magnetic materials, include but are not limited to, plastic, aluminum, glass and/or wood. The spherical permanent magnet 504 is disposed inside the hollow sphere 502 such that it can move freely therein, as shown by arrows 506, 508. Any motion of the hollow sphere 502 is easily detected as the spherical permanent magnet 504 rolls therein. Continuous walking motion causes the spherical permanent magnet 504 to rotate and bounce around within the hollow sphere 502.

The movement of the spherical permanent magnet 504 can be used to generate electricity. In this case, a wire 602 is wrapped around the hollow sphere 502, as shown in FIG. 6. Motion and rotation of the spherical permanent magnet 504 causes a change in a magnetic flux in the wire 602. This change in magnetic flux causes a current to be induced in the wire 602.

Although the wire 602 is shown in FIG. 6 as extending in a single direction along the surface of the hollow sphere, the present solution is not limited in this regard. For example, in some scenarios, the wire is disposed on the hollow sphere such that there are at least two orthogonal wraps thereof around the hollow sphere. This orthogonal wire configuration ensures that motion and rotation of the spherical permanent magnet 504 in any direction will produce energy.

Figure 7:
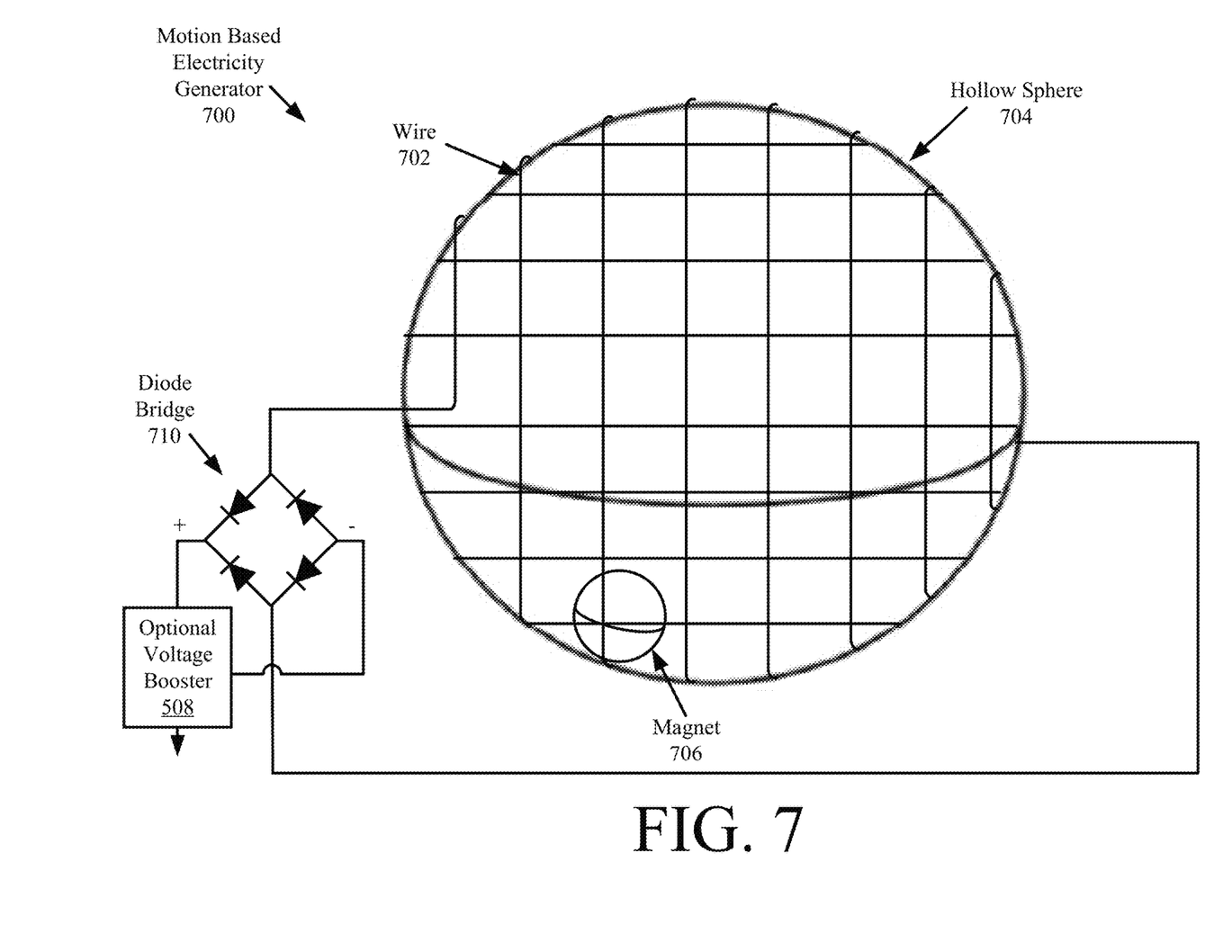
FIG. 7 is an illustration of another illustrative architecture for a motion based electricity generator.

An illustration of a motion based electricity generator 700 having such an orthogonal wire configuration is shown in FIG. 7. Motion based electricity generators 302, 402 are the same as or substantially similar to motion based electricity generator 700. As such, the discussion of motion based electricity generator 700 is sufficient for understanding motion based electricity generators 302, 402.

The motion based electricity generator 700 employs a device able to convert motion of the tag into electricity. This device comprises a hollow sphere 704 in which a spherical permanent magnet 706 is disposed. The hollow sphere 704 is formed of any non-magnetic material. Such non-magnetic materials, include but are not limited to, plastic, aluminum, glass and/or wood. The spherical permanent magnet 706 is disposed inside the hollow sphere 704 such that it can move freely therein. Any motion of the hollow sphere 704 is easily detected as the spherical permanent magnet 706 rolls therein. Continuous walking motion causes the spherical permanent magnet 706 to rotate and bounce around within the hollow sphere 704.

The movement of the spherical permanent magnet 706 can be used to generate electricity. In this case, a wire 702 is wrapped around the hollow sphere 704, as shown in FIG. 7. Motion and rotation of the spherical permanent magnet 706 causes a change in a magnetic flux in the wire 702. This change in magnetic flux causes a current to be induced in the wire 702.

The AC output voltage of the wire 702 is converted into a DC voltage via a diode bridge 710. Diode bridges are well known in the art, and therefore will not be described herein. Still, it should be understood that the diode bridge 710 is a full wave rectifier that is able to harvest energy in both directions. Notably, low current in this design can utilize lower than standard diode breakdown voltages. The DC output voltage of the diode bridge 710 is optionally provided to a voltage booster 508. Voltage boosters are well known in the art, and therefore will not be described herein. Any known or to be known voltage booster can be used herein without limitation.

Figure 8:
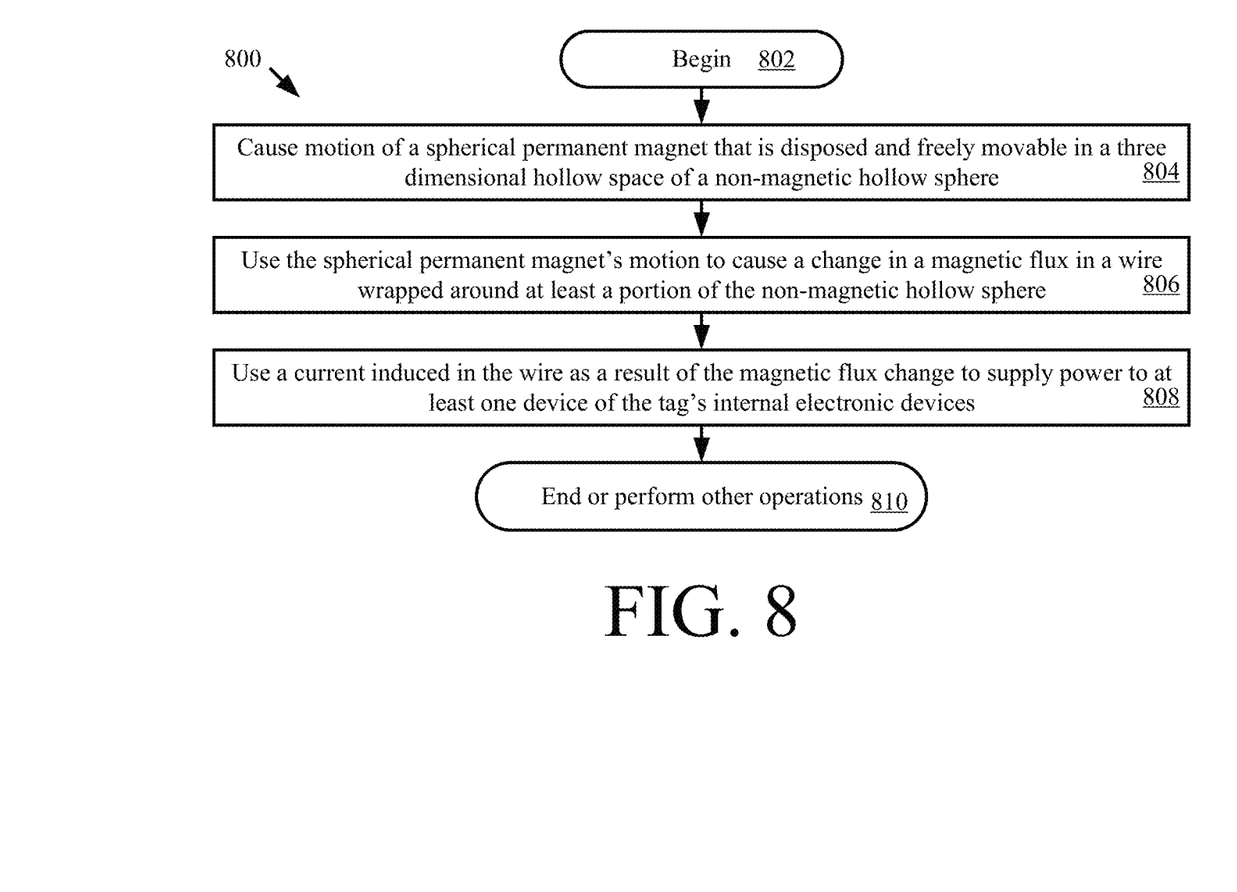
FIG. 8 is a flow diagram of an illustrative method for operating a tag.

Referring now to FIG. 8, there is provided a flow diagram of an illustrative method 800 for operating a tag (e.g., tag 112, 118 of FIG. 1 or 200 of FIG. 2). Method 800 begins with 802 and continues with 804 where motion of a spherical permanent magnet (e.g., spherical permanent magnet 504 of FIG. 5 or 706 of FIG. 7) is caused. The spherical permanent magnet is disposed and freely movable in a three dimensional internal space (e.g., space 506 of FIG. 5) of a non-magnetic hollow sphere (e.g., hollow sphere 502 of FIG. 5) located within the tag.

In 806, the spherical permanent magnet's motion is used to cause a change in a magnetic flux in a wire (e.g., wire 602 of FIG. 6 or 702 of FIG. 7) wrapped around at least a portion of the non-magnetic hollow sphere. The wire extends in a single direction along an outer surface of the non-magnetic hollow sphere, or is wrapped around the non-magnetic hollow sphere in at least two orthogonal directions. The change in the magnetic flux induces a current in the wire. The current is generated from 3D motion of the spherical permanent magnet. The current is used in 808 to supply power to at least one device of the tag's internal electronic devices that is configured to facilitate at least one of an inventory count and an inventory security. The device includes, but is not limited to, a communications enabled device (e.g., communications enabled device 204 of FIG. 2) and/or an energy storage device (e.g., a rechargeable battery 436 of FIG. 4, a super capacitor storage element 304 of FIG. 3, and/or a super capacitor storage element 414 of FIG. 4). In some scenarios, the communications enabled device is supplied power only when the tag is in motion or the tag's magnetic current has indicated or is indicating that the tag is in motion. A value of the tag's magnetic current can be compared to a threshold value to determine if it indicates that the tag is in motion or has been in motion within a certain period of time (e.g., within the last 1-5 seconds). Subsequently, 810 is performed where method 800 ends or other operations are performed (e.g., communicate information (e.g., items 224 and/or 226 of FIG. 2) from the tag to an external device (e.g., tag reader 120 of FIG. 1).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A security tag detectable by a wireless tag reader, comprising:
    an internal electricity generator comprising:
        a non-magnetic hollow sphere forming therein an internal space;
        a spherical permanent magnet, disposed and freely movable within the sphere;
        a wire wrapped around at least a portion of the sphere;
        wherein motion of the magnet in the space induces a current in the wire; and
    a security component comprising at least one of a Radio Frequency Identification ("RFID") component and an Electronic Article Surveillance ("EAS") component connected to the wire to form a circuit, and operative upon a threshold flow of current to indicate that the tag is in motion.

2. The security tag according to claim 1, wherein the wire extends in a single direction along an outer surface of the non-magnetic hollow sphere.

3. The security tag according to claim 1, wherein the wire is wrapped around the non-magnetic hollow sphere in at least two orthogonal directions.

4. The security tag according to claim 1, wherein the current is generated from 3D motion of the spherical permanent magnet.

5. The security tag according to claim 1, wherein the security component comprises a communications enabled device.

6. The security tag according to claim 1, further comprising an energy storage device in electrical communication with the generator and the security component.

7. The security tag according to claim 6, wherein the energy storage device comprises a rechargeable battery or a capacitor.

* * * * *

UNITED STATES PATENT AND TRADEMARK OFFICE
CERTIFICATE OF CORRECTION

| | |
|---|---|
| PATENT NO. | : 10,949,723 B2 |
| APPLICATION NO. | : 15/966707 |
| DATED | : March 16, 2021 |
| INVENTOR(S) | : Trivelpiece et al. |

Page 1 of 1

It is certified that error appears in the above-identified patent and that said Letters Patent is hereby corrected as shown below:

In the Specification

In Column 3, Line 10, delete "Internet of Things ("IoT")" and insert -- Internet of Things ("IoTs") --, therefor.

In Column 5, Line 20, delete "B luetooth" and insert -- Bluetooth --, therefor.

In Column 9, Line 37, delete "as cause" and insert -- as to cause --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*